US010362498B2

(12) United States Patent
Shahid et al.

(10) Patent No.: US 10,362,498 B2
(45) Date of Patent: Jul. 23, 2019

(54) METHOD AND APPARATUS FOR COORDINATED MULTIPOINT RECEIVER PROCESSING ACCELERATION AND LATENCY REDUCTION

(71) Applicant: Cavium, LLC, Santa Clara, CA (US)

(72) Inventors: Ahmed Shahid, San Jose, CA (US); Jason Daniel Zebchuk, Watertown, MA (US); Tejas Maheshbhai Bhatt, Sunnyvale, CA (US); Hong Jik Kim, San Jose, CA (US)

(73) Assignee: CAVIUM, LLC, Santa Clara, CA (US)

( * ) Notice: Subject to any disclaimer, the term of this patent is extended or adjusted under 35 U.S.C. 154(b) by 14 days.

(21) Appl. No.: 15/693,020

(22) Filed: Aug. 31, 2017

(65) Prior Publication Data

US 2019/0021013 A1    Jan. 17, 2019

Related U.S. Application Data

(60) Provisional application No. 62/532,647, filed on Jul. 14, 2017.

(51) Int. Cl.
| | |
|---|---|
| *H04W 72/04* | (2009.01) |
| *H04W 24/02* | (2009.01) |
| *H04L 5/00* | (2006.01) |
| *H04B 7/024* | (2017.01) |
| *H04W 72/12* | (2009.01) |
| *H04L 12/26* | (2006.01) |
| *H04L 25/02* | (2006.01) |
| *H04W 88/02* | (2009.01) |

(52) U.S. Cl.
CPC ............ *H04W 24/02* (2013.01); *H04B 7/024* (2013.01); *H04L 5/0035* (2013.01); *H04L 25/02* (2013.01); *H04L 43/0852* (2013.01); *H04W 72/12* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2007/0015529 A1* | 1/2007 | Choi | ................... | H04W 52/286 455/522 |
| 2014/0219267 A1* | 8/2014 | Eyuboglu | ........... | H04W 56/001 370/350 |
| 2016/0037550 A1* | 2/2016 | Barabell | .............. | H04B 17/318 455/450 |

(Continued)

*Primary Examiner* — Brandon M Renner
(74) *Attorney, Agent, or Firm* — JW Law Group; James M Wu (57) ABSTRACT

Methods and apparatus for coordinated multipoint receiver processing acceleration and latency reduction. In an exemplary embodiment, an apparatus includes a receiver that receives symbols from a wireless transmission and stores the symbols in a memory. The receiver also outputs an indicator that indicates that storage of the symbols in the memory has begun. The apparatus also includes a controller that outputs control signaling in response to the indicator. The apparatus also includes a link that acquires the symbols and remote scheduling and control information (RSCI) from the memory in response to receiving the control signaling. The link combines the symbols with the RSCI to form packets and transmits the packets to an external system.

17 Claims, 8 Drawing Sheets

(56) References Cited

U.S. PATENT DOCUMENTS

2017/0237484 A1\* 8/2017 Heath .................. H04B 17/336
                                                                    398/26
2018/0145858 A1\* 5/2018 Kim .................... H04L 27/2621
2018/0287828 A1\* 10/2018 Tavares ............. H04L 25/03006

\* cited by examiner

METHOD AND APPARATUS FOR COORDINATED MULTIPOINT RECEIVER PROCESSING ACCELERATION AND LATENCY REDUCTION

CLAIM TO PRIORITY

This application claims the benefit of priority based upon U.S. Provisional Patent Application having Application No. 62/532,647, filed on Jul. 14, 2017, and entitled "METHODS AND APPARATUS FOR COORDINATED MULTIPOINT RECEIVER PROCESSING ACCELERATION AND LATENCY REDUCTION," which is hereby incorporated herein by reference in its entirety.

FIELD

The present invention relates to the operation of communications networks. More specifically, the present invention relates to methods and apparatus for processing data in a communication system.

BACKGROUND

With the rapidly growing trend of mobile and remote data access over high-speed communication networks, such as 3G, 4G, or LTE cellular services, accurately delivering data has become increasingly challenging and difficult. A high-speed communication network that is capable of delivering information includes, but is not limited to, a wireless network, a cellular network, wireless personal area network ("WPAN"), wireless local area network ("WLAN"), wireless metropolitan area network ("MAN"), or the like. These networks typically utilize different transmission or network protocols based on industry standards for each protocol.

One technique used to address the challenges of high-speed wireless data communication is referred to as Coordinated Multipoint (CoMP) processing. CoMP processing enables dynamic transmission and reception between user equipment (UE) and multiple geographically separated antennas. For example, UE signals received by multiple antennas can be evaluated so that the best signal is selected for processing. In another example, UE signals received by multiple antennas can be combined and processed to produce a final output signal, which improves processing for weak signals or signals that include interference.

CoMP processing is based on receiving multiple versions of the same signal at multiple antennas. One or more of the multiple versions are transmitted to a single processing system to give that processing system access to the one or more versions of the signal for processing. Thus, one problem associated with CoMP processing is signal latency (or delay) that occurs when transferring the different versions of the received signal to the central processing system. For example, delays may be introduced by the need for additional processing to transfer the different versions to a central processor, and by the communication delay from the different receiving sites. If there is too much latency, the central processing system may not be able to process the multiple versions of the received signal within the available time interval.

Therefore, it would be desirable to have a way to provide low latency CoMP processing in a wireless communications network, thereby overcoming the problems of latency associated with conventional systems.

SUMMARY

In various exemplary embodiments, methods and apparatus are provided for CoMP receiver processing acceleration and latency reduction. In an exemplary embodiment, a CoMP baseband architecture is provided that includes multiple baseband processing systems that communicate with each other using a high-speed communication channel. Each baseband processing system accepts symbols received at a particular antenna. Symbols transmitted by user equipment (UE) and received at a first antenna are accepted by a first baseband processing system. These received symbols are transferred with little delay to a link that combines the symbols with associated remote scheduling control information (RSCI) to generate packets.

The link transmits the packets over the high-speed communication channel from the first baseband processing system to a second baseband processing system. At the second baseband processing system, the symbols from the packets are transferred with little delay from a receiving link to a memory. At least a portion of the remote scheduling control information is transferred to a scheduler at the second baseband processing system. In one exemplary embodiment, the scheduler at the second baseband processor uses the remote scheduling control information it receives to schedule processing of the symbols stored in the memory.

In another exemplary embodiment, the same symbols transmitted by the user equipment (UE) and received at a second antenna are accepted by the second baseband processing system and also stored in the memory. Thus, the second baseband processing system has access to two versions of the symbols transmitted by the UE and received at different antennas. Due to the high-speed transfer of the symbols from the first baseband processing system to the second baseband processing system, the latency between the two versions of the symbols stored in the memory is less than one symbol time, and typically less than one microsecond. The two versions are then individually or jointly processed at the second baseband processing system according to the remote scheduling control information. For example, the symbols are processed either individually or in combination to provide the best communication result.

In an exemplary embodiment, an apparatus is provided that includes a receiver that receives symbols from a wireless transmission and stores the symbols in a memory. The receiver also outputs an indicator that indicates that storage of the symbols in the memory has begun. The apparatus also includes a controller that outputs control signaling in response to the indicator. The apparatus also includes a link that acquires the symbols and remote scheduling and control information (RSCI) from the memory in response to receiving the control signaling. The link combines the symbols with the RSCI to form packets and transmits the packets to an external system.

In an exemplary embodiment, a method is provided that includes operations of receiving symbols from a wireless transmission, storing the symbols in a memory, and signaling that the symbols are available in the memory. The method also includes operations of acquiring the symbols and remote scheduling control information RSCI in response to the signaling, combining the symbols with the RSCI to form packets, and transmitting the packets to an external system.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given

DETAILED DESCRIPTION

The purpose of the following detailed description is to provide an understanding of one or more embodiments of the present invention. Those of ordinary skill in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of the embodiments of this disclosure.

Various exemplary embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, E-UTRAN Node B (eNodeB or eNB), computer and/or communication devices or mechanisms, or combinations of components thereof. The term "computer" includes a processor, memory, and buses capable of executing instructions wherein the computer refers to one or a cluster of computers, personal computers, workstations, mainframes, or combinations of computers thereof.

Figure 1:
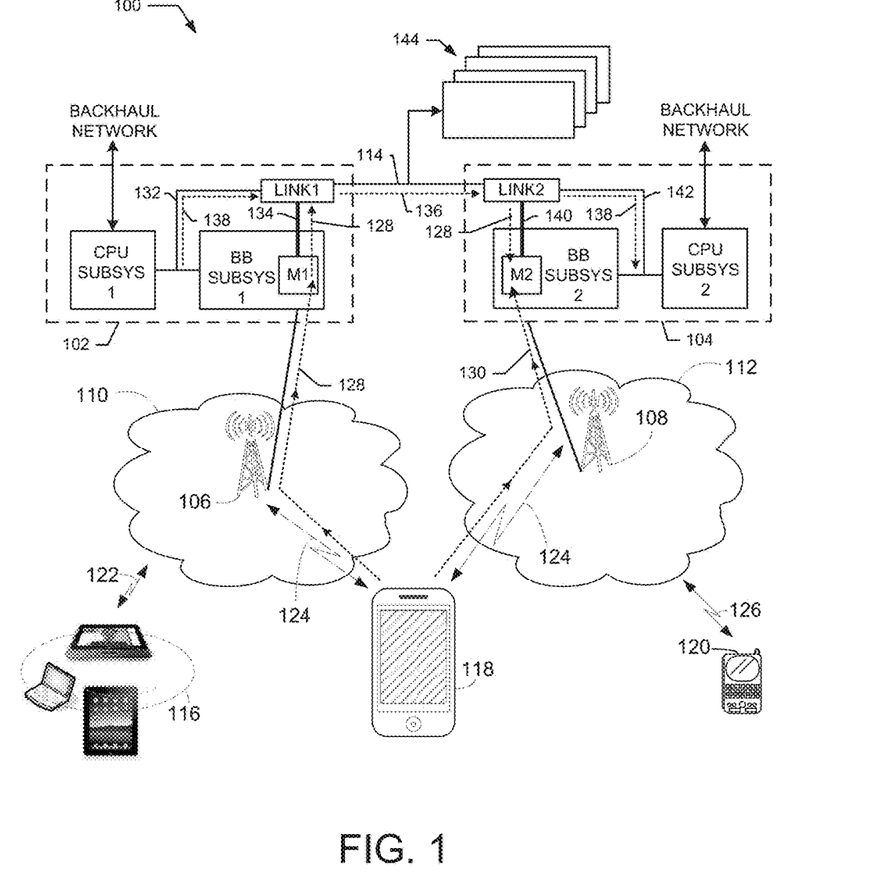
FIG. 1 shows a communications network that includes an exemplary embodiment of a novel CoMP architecture constructed in accordance with exemplary embodiments of the present invention.

FIG. 1 shows a communications network 100 that includes an exemplary embodiment of a novel CoMP architecture constructed in accordance with exemplary embodiments of the present invention. Network 100 includes two baseband processing system 102 and 104 that are in communication with eNBs 106 and 108 in cell sites 110 and 112, respectively. In an exemplary embodiment, the baseband processing systems 102 and 104 are constructed using system-on-chip (SOC) technology and are located in a central processing facility. The SOCs of the systems 102 and 104 may also be located in separate facilities.

The baseband processing system 102 comprises CPU subsystem) and baseband subsystem). The baseband processing system 104 comprises CPU subsystem2 and baseband subsystem2. The baseband processing system 102 includes link) and the baseband processing system 104 includes link2. Link) and link2 comprise circuits and/or components to support communication over one or more high speed channels. In this exemplary embodiment, a high-speed channel 114 is coupled between link) and link2. The baseband subsystem) includes memory (M1) and the baseband subsystem2 includes memory (M2).

The eNBs 106 and 108 are further coupled to various user equipment (UE), such as tablets and/or iPad® 116, cellular phone 118, and handheld device 120, via wireless communications links 122, 124, and 126. Cell site 110 facilitates network communication between mobile devices such as UEs 116 and 118 and the baseband processing system 102 via eNB 106, and cell site 112 facilitates network communication between baseband processing system 104 and UEs 118 and 120 via eNB 108. It should be noted that the cell sites 110 and 112 can include additional radio towers as well as other land switching circuitry.

In an exemplary embodiment, an advantage of using the CoMP architecture shown in FIG. 1 is to improve the processing of uplink transmissions from a UE device that are received at different antennas. For example, it will be assumed that an uplink transmission from device 118 is received by both eNBs 106 and 108. The uplink transmission from device 118 to the baseband processing system 102 is shown by symbols 128 and that same uplink transmission from device 118 is received by the baseband processing system 104, as shown by symbols 130. Thus, both baseband processing systems 102 and 104 receive the same transmitted symbols from the device 118, however, due to the reception of the transmission by different antennas, the signal characteristics of the two received transmissions may be different. For example, the symbols 128 received by baseband processing system 102 may have more or less signal strength than the symbols 130 received by baseband processing system 104. Thus, it would be desirable to process the received transmitted symbols with the better quality.

In an exemplary embodiment, the symbols 130 of the uplink transmission are received by the baseband processing system 104 and stored in the memory M2. The symbols 128 of the uplink transmission are received by the baseband processing system 102 and stored in the memory M1. As the symbols 128 are stored in the memory M1, the memory M1 transfers the symbols 128 to the link1. In an exemplary embodiment, the transfer takes place over a direct connection 134 from the memory M1 to the link1. In another exemplary embodiment, the transfer of the received symbols from M1 to the link1 takes place over a high-speed bus 132. In an exemplary embodiment, the bus 132 connects the baseband subsystem 1, the CPU subsystem 1, and the link1.

As the symbols 128 are received by the link1, remote scheduling control information is sent to the link1. In one embodiment, the RSCI 138 is sent over the bus 132, and in another embodiment, the RSCI is sent from the memory M1. In exemplary embodiments, the remote scheduling control information 138 define how the symbols 128 are to be processed at a remote processing system, such as the baseband processing system 104.

The link1 combines the symbols 128 it receives from the memory M1 with the remote scheduling control information 138 to generate packets 136. The packets 136 then flow from link1 over the high-speed channel 114 to link2 of the baseband processing system 104. The link2 separates the symbols 128 from the packets 136 and stores the symbols in the memory M2. The remote scheduling control information 138 also may be stored in the memory M2. The link2 sends the symbols 128 to the memory M2 using a direct connection 140, and sends at least a portion of the remote scheduling control information 138 to the baseband subsystem 2 over bus 142. In another exemplary embodiment, the symbols 128 received by the link2 flow over a high-speed bus 142 to the memory M2.

Thus, the baseband processing system 104 now has stored in memory M2 two versions of the symbols transmitted by device 118 and received by the eNBs 106 and 108. For example, symbols 128 represent a first version of the symbols and symbols 130 represent a second version of the symbols. In addition, the baseband subsystem 2 has obtained the remote scheduling control information 138 from the baseband processing system 102. Using the remote scheduling control information, the baseband processing system 104 can determine how to process the symbol transmissions stored in the memory M2. For example, either version of the symbols can be selected for processing, in whole or in part, or the symbols may be combined before processing to improve signal quality. For example, the baseband processing system 104 can compute a signal-to-noise ratio (SNR) for each version of the symbols in the memory M2 and use this SNR value to determine which symbols to process. The computations can be compared on a frame by frame basis to pick the better symbols to process.

In order to reduce or minimize latency, the direct connections 134 and 136 provide fast transfers of symbol data from the memory M1 to the link1 and from the link2 to the memory M2, respectively. In addition, the high-speed channel 114 provides high speed transmission of the symbol data between link1 and link2. Thus, the overall delay in receiving both versions of the symbols at the baseband processing system 104 is much less than one symbol time. In an exemplary embodiment, the delay is less than one microsecond.

It should also be noted that the transfer of symbol data from link1 can be extended to any number of additional baseband processing systems, for example, a plurality of additional processing systems are shown at 144. Thus, the novel CoMP architecture disclosed herein allows the reception of symbol data and the processing of the symbol data to take place at separate processing systems. In addition, a selected baseband processing system can generate the RSCI that controls processing of the symbols at other baseband processing systems.

It should also be noted that similar processing and data handling can be performed to support the transmission of symbol data and remote scheduling control information from the baseband processing system 104 to the baseband processing system 102. For example, in an exemplary embodiment, the received symbols can be exchanged over the high-speed channel 114 so that both systems 102 and 104 receive both versions of the transmitted symbols. A more detailed description of the exemplary embodiments of the CoMP architecture is provided below.

Figure 2:
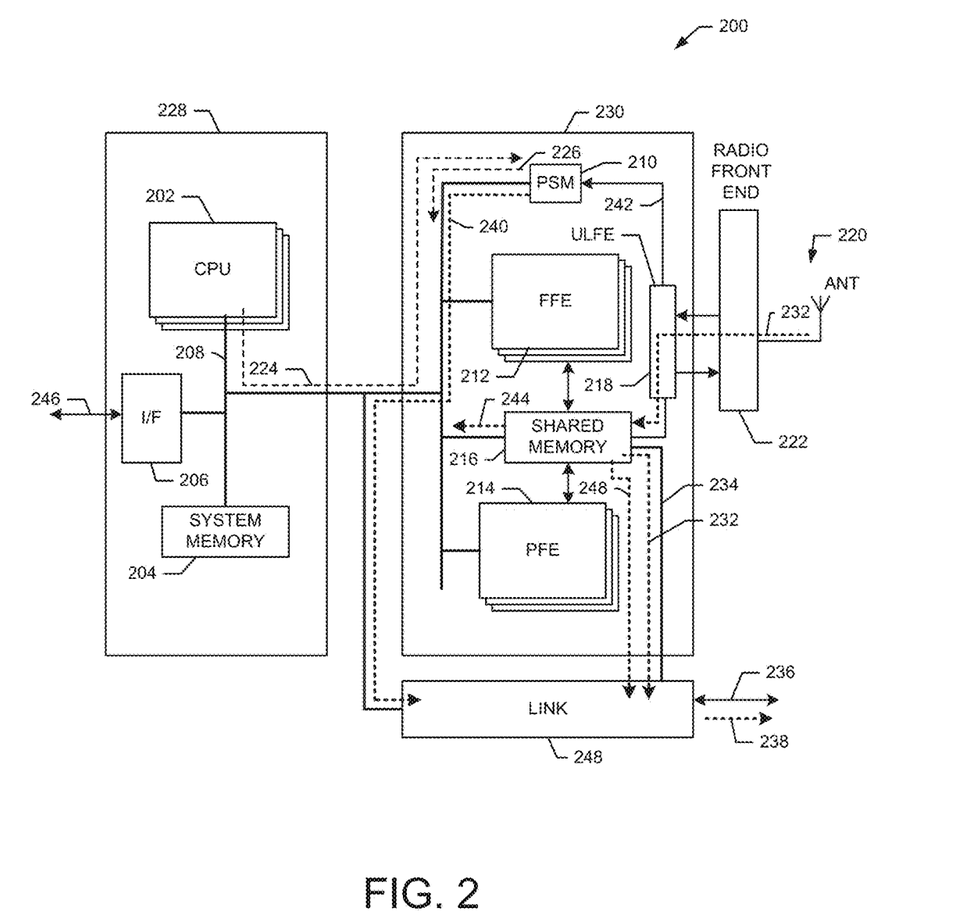
FIG. 2 shows a detailed exemplary embodiment of a novel baseband processing system for use in the CoMP architecture shown in FIG. 1.

FIG. 2 shows a detailed exemplary embodiment of a novel baseband processing system 200 for use in the CoMP architecture shown in FIG. 1. For example, the baseband processing system 200 shown in FIG. 2 is suitable for use as the baseband processing system 102 shown in FIG. 1 to receive transmitted symbols and forwards these symbols and remote scheduling control information to a second baseband processing system (e.g., system 104) with low latency.

The baseband processing system 200 includes two primary subsystems, namely the CPU subsystem 228 and the baseband processing subsystem 230. The CPU subsystem 228 includes a pool of general purpose CPUs 202 that provided layer 2 through layer 7 OSI layer packet processing functions. The CPU subsystem 228 also includes one or more interfaces (I/F) 206 that support various high-speed links 246, such as Ethernet, SRIO, 10GE, or PCIe to a backhaul network.

In an exemplary embodiment, the CPU subsystem 228 creates job requests 224 (e.g., job descriptors) and radio data sets in a system memory 204 or in a shared memory 216 and these job requests are scheduled to be processed by the baseband processing subsystem 230.

The CPU subsystem 228 is connected to the baseband processing subsystem 230 over one or more high speed fully pipelined I/O busses 208. Each of the busses 208 is a shared, full duplex bus allowing simultaneous reads and writes. The CPUs 202 can communicate directly with baseband processing subsystem 230 using memory mapped I/O reads and writes. The baseband processing subsystem 230 can also communicate with the CPU subsystem 228 using coherent memory reads and writes to system memory 204 as well as through programmable interrupts.

The baseband processing subsystem 230 includes a pool of resource blocks comprising fixed functional elements (FFE) 212 and/or programmable functional elements (PFE) 214 that are used to carry out signal processing tasks required for symbol processing. The baseband processing subsystem 230 also includes an uplink front end (ULFE) 218, which interfaces with at least one radio front end 222 that is coupled to at least one antenna 220.

To execute processing tasks, the baseband processing subsystem 230 includes a flexible job scheduler (PSM) 210 that receives job requests 224 from the CPUs 202 over the busses 208 and queues these job requests until they are processed into one or more scheduled jobs 226 that are sent to the FFE 212 and/or the PFE 214 for completion. Thus, the CPUs 202 are able to implement one or more processing pipelines by generating the appropriate sequence of job requests and sending this sequence of job requests to the baseband processing subsystem 230, which schedules the job requests to be processed by the fixed and/or programmable functional elements.

During CoMP operation, wirelessly transmitted symbols 232 are received by the antenna 220 and flow through the radio front end 222 to the ULFE 218. The ULFE 218 stores these symbols into the shared memory 216. At the same time, the ULFE 218 sends an indicator 242 to the scheduler 210 to indicate that the storage of received symbol data into the memory 216 has begun. The memory also contains RSCI that is pre-stored and/or configured during system startup.

In response to receiving the indicator 242, the scheduler 210 outputs control signaling 240 to the link 248. The control signaling 240 control the link 248 to obtain the symbols 232 and RSCI 248 from the shared memory 216 over direct connection 234. In another exemplary embodiment, the control signaling 240 controls the link 248 to obtain the symbols and RSCI stored in the memory 216 over the bus 208 (as indicated by path 244). The link 248 operates to combine the symbols 232 with the remote scheduling control information 248 to generate packets 238 that are transmitted over high-speed channel 236 to one or more other baseband processing systems.

Thus, the baseband processing system 200 operates to forward symbols 232 received at the antenna 220, combined with remote scheduling control information 248 to other baseband processing with very little latency, thereby allowing the symbols to be processed in a CoMP architecture. The remote scheduling control information 248 controls how the symbols are processed by other baseband processing systems. Thus, remote scheduling of symbol processing is controlled by the baseband processing system 200.

Figure 3:
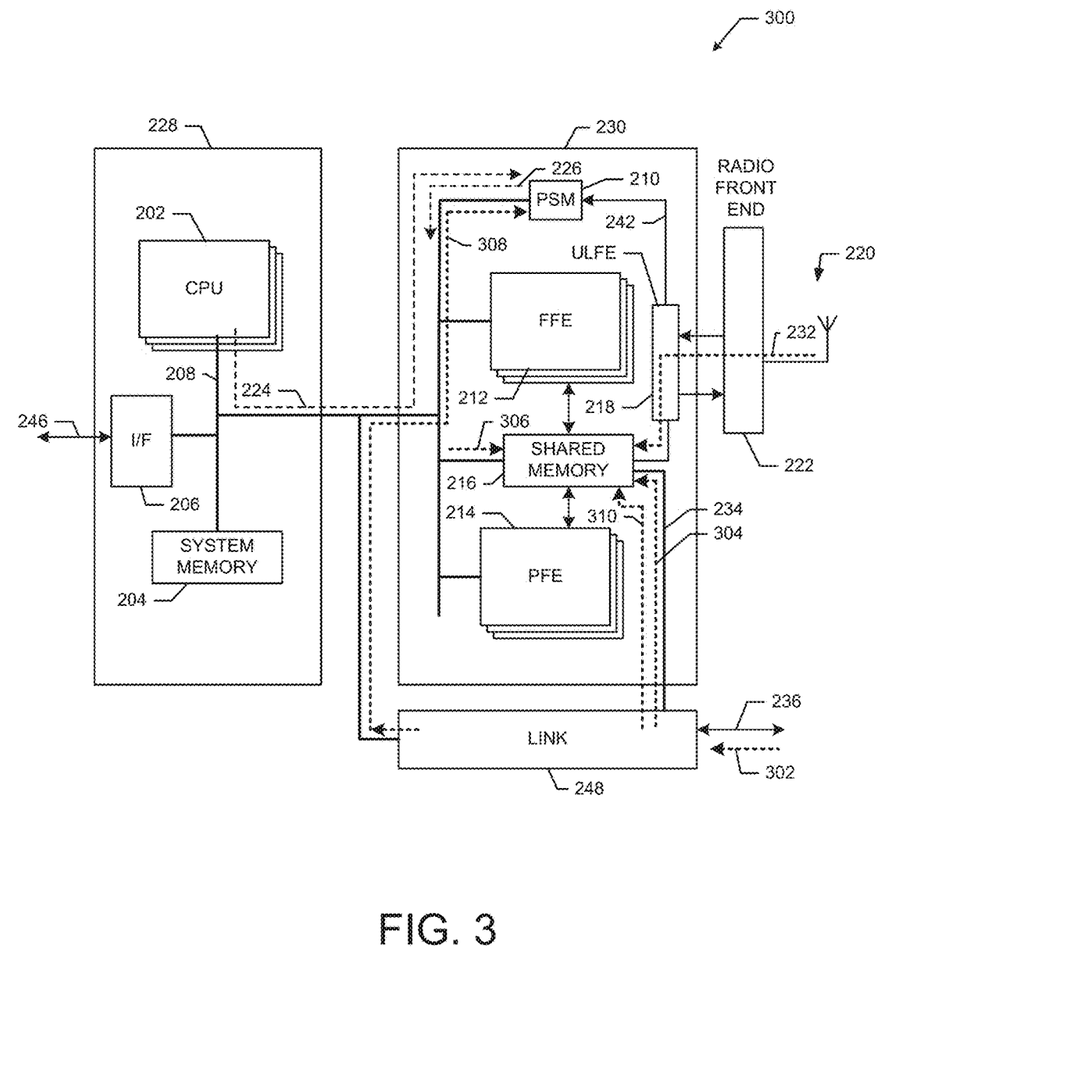
FIG. 3 shows a detailed exemplary embodiment of a novel baseband processing system for use in the CoMP architecture shown in FIG. 1.

FIG. 3 shows a detailed exemplary embodiment of a novel baseband processing system 300 for use in the CoMP architecture shown in FIG. 1. For example, the baseband processing system 300 shown in FIG. 3 is suitable for use the baseband processing system 104 to receive symbols and remote scheduling control information forwarded from a first baseband processing system (e.g., system 102) with low latency.

The structure of the baseband processing system 300 shown in FIG. 3 is similar to the structure of the baseband processing system 200 shown in FIG. 2 and so to avoid redundancy, the descriptions of these structures will not be repeated here. During CoMP operation, wirelessly transmitted symbols 232 are received by the antenna 220 and flow through the radio front end 222 to the ULFE 218. The ULFE 218 stores these symbols 232 into the shared memory 216. At the same time, the ULFE 218 sends an indicator 242 to the scheduler 210 to indicate that the storage of received symbol data into the memory 216 has begun.

Shortly after symbols are received by the ULFE 218, packets 302 are received over channel 236 by the link 248. In an exemplary embodiment, the packets 302 include symbols that were received by a different antenna and communicated to the link 248 from a second baseband processing system. In an exemplary embodiment, the packets 302 include remote scheduling control information that is also received from the second baseband processing system. For example, the packets 302 may have been received from the baseband processing system 102 shown in FIG. 1.

In an exemplary embodiment, the packets 302 are transmitted over the high-speed channel 236 to the link 248 with very little delay. In an exemplary embodiment, the link 248 decodes the received packets 302 and stores the received symbols 304 in the memory 216 using the direct connection 234. The link 248 also transfers all or part of the received RSCI 310 to the memory 216. In another exemplary embodiment, the link 248 sends the received symbols and the RSCI over the bus 208 for storage in the memory 216, as shown by path 306. Thus, the memory 216 now contains two versions of symbols (e.g., symbols 232 and symbols 304) received from two antennas, which can be processed by the operation of the scheduler 210.

The packet 302 include RSCI that indicates how the symbols are to be processed. The link 248 decodes the RSCI from the received packets and sends at least a portion of this information over the bus 208 to the scheduler 210 as indicated at 308. For example, the portion of the RSCI sent to the scheduler includes commands that can be interpreted by the scheduler 210 to control how the symbols stored in the memory 216 are processed. The scheduler 210 then schedules processing tasks 226 to process the symbols stored in the memory 216 based on the received commands decoded from the remote scheduling control information.

Thus, the baseband processing system 300 shown in FIG. 3 operates to receive symbols 232 over the antenna 220 and symbols 304 through the high-speed channel 236. Both sets of symbols were originally transmitted from a UE device and received by at least two antennas. In an exemplary embodiment, the latency between the symbols is very low (e.g., less than one symbol time). Thus, the baseband processing system 300 is able to select and process symbols having the better quality. The baseband processing system 300 also operates to receive remote scheduling control information attached to symbols received by the link interface 248. The command portion 308 of the remote scheduling control information is used by the scheduler 210 to control how symbols are processed.

Figure 4A:
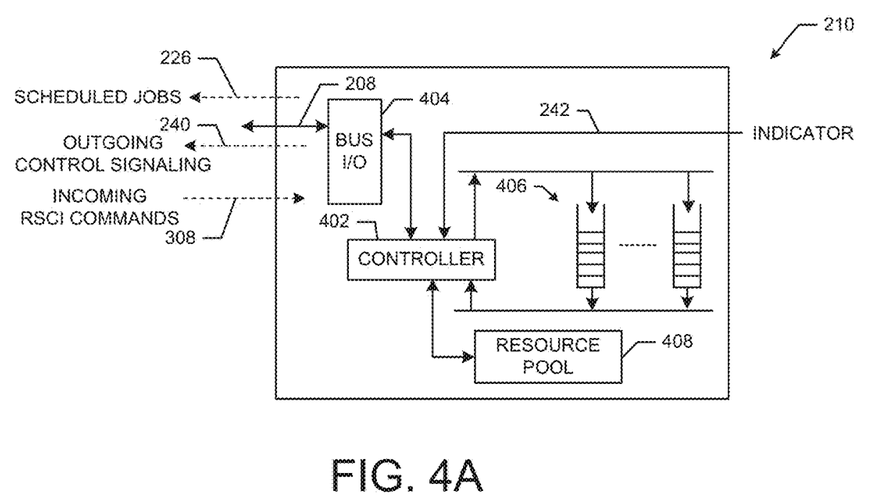
FIG. 4A shows a detailed exemplary embodiment of the job scheduler (PSM) shown in FIGS. 2-3.

FIG. 4A shows a detailed exemplary embodiment of the job scheduler (PSM) 210 shown in FIGS. 2-3. The PSM 210 comprises a controller 402, bus interface 404, one or more hardware queues 406, job resource pool 408, and memory 410. The controller 402 receives the job requests on the bus 208 from the CPUs 202 through the bus interface 404 and queues these requests in the hardware queues 406. This dynamic hardware job queuing mechanism is used to service jobs from the same queue in strict order, or to allow jobs from different hardware queues to execute in parallel and out of order giving a high degree of freedom and control for job scheduling of radio timeline events. Jobs from the same queue can also be serialized to delay the launch of the next job until a previous job has completed.

The PSM 210 maintains a resource pool 408 to assign job types to specific resources (e.g., functional elements). When a pending job reaches the head of a hardware queue, and a functional element is available for the intended job type, the PSM 210 will dispatch the scheduled job to the functional element and track the job to its completion. New job requests can also be initiated by previous job completions or by other external events (e.g., radio frame or delay timer values).

As the jobs exit the queues, the controller 402 routes them (e.g., as scheduled jobs) to the appropriate functional element (e.g., FFE 212 or PFE 214) for completion. In an exemplary embodiment, once an FFE or PFE completes a job it sends back a corresponding job completion indicator. The controller 402 can schedule additional jobs for the functional element in response to receiving the job completion indicator associated with the current job.

The following description describes operation of the PSM 210 when located in a baseband processing system that is operating to transmit packets, such as the baseband processing system 200 shown in FIG. 2. During operation, the controller 402 receives the indicator 242 from the ULFE 218 when receiving the symbols 232. The indicator 242 indicates that symbols 232 received by the ULFE 218 are being written into the memory 216. In response to receiving the indicator 242, the controller 402 outputs control signaling 240 to control the link 248 to acquire these symbols from the memory 216. The transfer can be done using either the direct connection 234 or the bus 208.

The PSM 210 transmits the control signaling 240 over the bus 208 to the link 248. In an exemplary embodiment, the remote scheduling control information (RSCI) 248 is stored at the memory 216 and is available for transmission to the link 248 when the indicator 242 is detected. For example, the RSCI is stored in the memory 216 at start up. The link 248 acquired the remote scheduling control information 248 and the symbols 232 from the memory 216 and combines the symbols 232 and the RSCI 248 to form packets 238 that are transmitted over the channel 236 to one or more other baseband processing systems. Thus, the transmitted remote scheduling control information 240 allows the PSM 210 to control the types of processing and tasks performed to process the symbols at a second baseband processor.

The following description describes operation of the PSM 210 when located in a baseband processing system that is operating to receive packets, such as the baseband processing system 300 shown in FIG. 3. In an exemplary embodiment, the packets 302 are received at the link 248. The link 248 transfers the symbols 304 and the RSCI 310 to the memory 216 using direct connection 234. The link 248 then transfers at least a portion of the RSCI 308 comprising commands to the controller 402 over the bus 208. For example, packets 302 are received over the channel 236 from a second baseband processing system and include the remote scheduling control information. The link 248 separates the remote scheduling control information from the symbols and passes the commands from the remote scheduling control information 308 to the scheduler 210 using the bus 208. The controller 402 queues the commands 308 in the queues 406 for processing the received symbols. Thus, the received remote scheduling control information 308 allows a second baseband processing system to control the types of processing and tasks the scheduler 210 performs to process the received symbols.

Figure 4B:
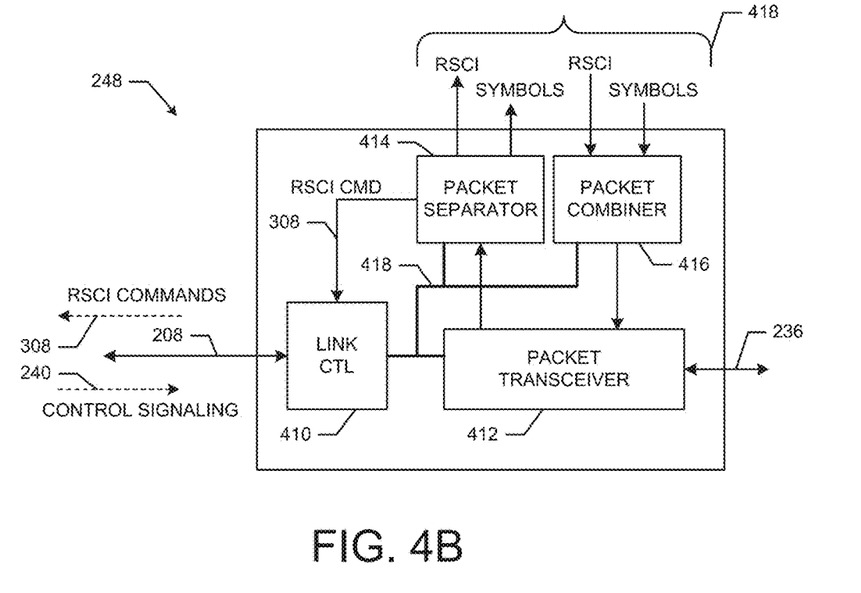
FIG. 4B shows a detailed exemplary embodiment of the link shown in FIGS. 2-3.

FIG. 4B shows a detailed exemplary embodiment of the link 248 shown in FIGS. 2-3. The link 248 comprises a link controller 410, packet transceiver 412, packet separator 414, and packet combiner 416. The link controller 410 controls the operation of the components of the link 248 using bus 418. The link controller 410 is coupled to the bus 208 to receive control signaling 240 from the scheduler 210. The link controller 410 also outputs RSCI commands 308 over the bus 208.

The packet transceiver 412 transmits and receives packets over the high-speed channel 236. The packet separator 414 processes received packets to separate the symbols and the RSCI information. The received symbols and the RSCI information are stored in the memory 216 using the memory interface 418. At least a portion of the RSCI information that comprises commands 308 are sent to the link controller 410 and thereafter output on the bus 208 to the scheduler 210. In response to the receiving the control signaling 240, the link controller 410 controls the packet combiner 416 to acquire symbols and RSCI information from the memory 216 using the memory interface 418. The acquired symbols and RSCI information are combined to form packets that are passed to the packet transceiver for transmission on the high-speed channel 236.

Figure 5:
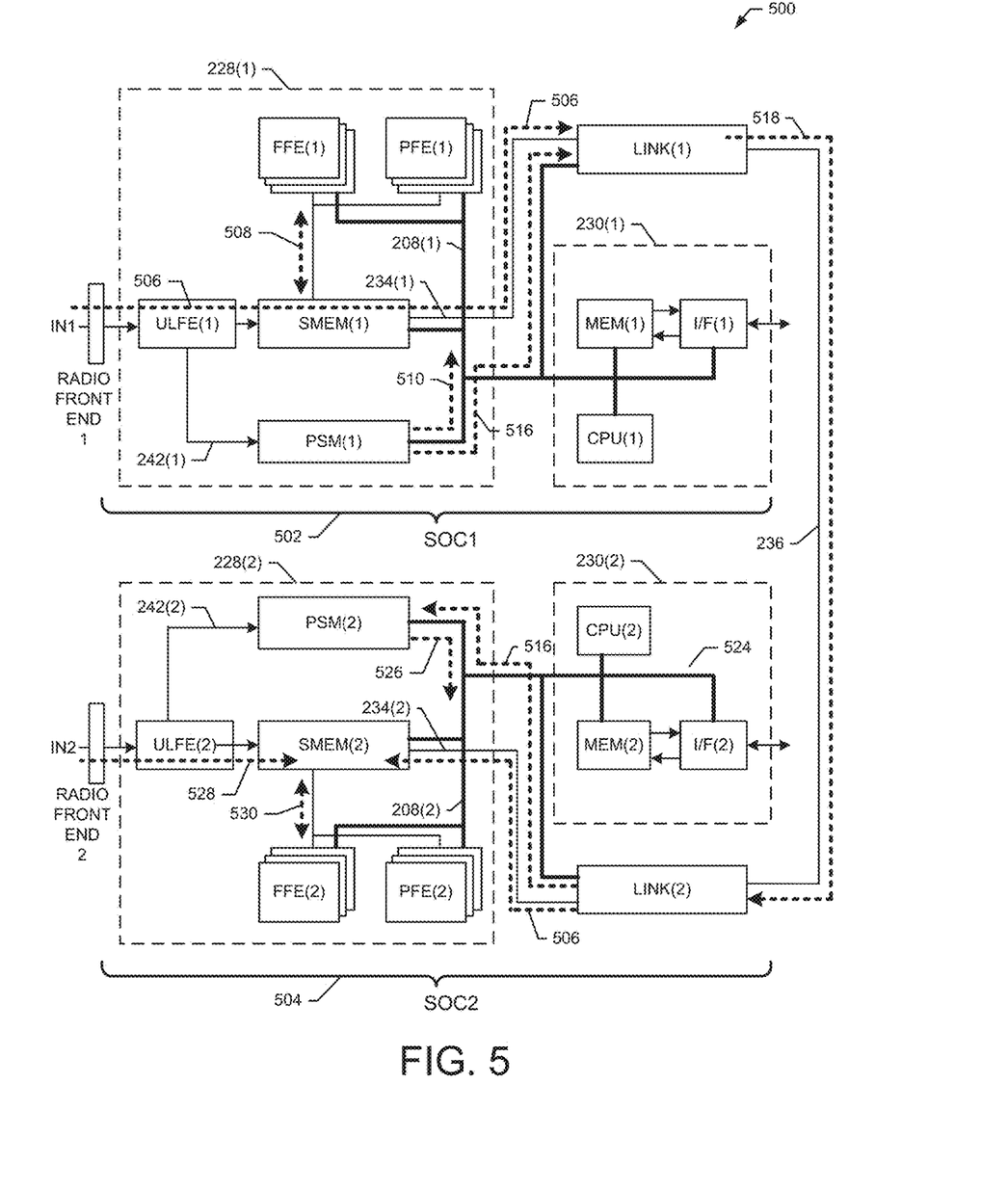
FIG. 5 shows an exemplary embodiment of a CoMP architecture comprising two baseband processing systems.

FIG. 5 shows an exemplary embodiment of a CoMP architecture comprising two baseband processing systems. For example, a first baseband processing system is configured within a first system-on-chip (SOC1) 502, and a second baseband processing system is configured within a second SOC2 504. The first baseband processing system 502 comprises baseband processing subsystem 228(1) and CPU processing subsystem 230(1). The second baseband processing system 504 comprises baseband processing subsystem 228(2) and CPU processing subsystem 230(2). In exemplary embodiments, the SOCs 502 and 504 can be located at the same physical location or in different physical locations.

During operation of the CoMP architecture, the ULFE(1) receives symbols 506 from a UE that are received at a first antenna through a first radio front end. For example, the symbols 506 from the first antenna are received at the IN1 input. The ULFE(1) writes the received symbols 506 to the SMEM(1), and activates indicator 242(1) to inform the PSM(1) that the received symbols 506 are now being written to the SMEM(1). In an exemplary embodiment, in response to receiving the indicator 242(1), the PSM(1) can process the received symbols using the FFE(1) and PFE(1) resources by obtaining the symbols from memory as indicated by path 508 and sending out the appropriate job tasks 510.

In another exemplary embodiment, in response to receiving the indicator 242(1), the PSM(1) outputs control signaling 516 to control the link(1) to acquire the symbols and associated RSCI information from the SMEM(1) over the direct connection 234(1). In still another exemplary embodiment, in response to receiving the control signaling 516, the link(1) acquires the symbols and the RSCI information from the SMEM(1) over bus 208(1). Thus, link(1) receives the symbols 506 and the RSCI information from the SMEM(1) soon after the storage of symbols begins.

The remote scheduling control information describes how the symbols 506 are to be processed at a second baseband processing system. The link(1) combines the remote scheduling control information with the symbols 506 to form packets 518. The packets 518 are then transmitted by the link(1) to the link(2) over the connection 236.

In an exemplary embodiment, when the packets 518 are received, link(2) separates the symbols 518 and the RSCI information. Link(2) writes the symbol data 506 and the RSCI information to the SMEM(2) as described above. The link(2) then transfers the command portion 516 of the RSCI over the bus 208(2) to the PSM(2). At this point the symbols received by the link(2) are stored in the SMEM(2) and the commands 516 included in the remote scheduling control information are queued for processing at the PSM(2).

Concurrently with the above processes, the ULFE(2) receives symbols 528 from the UE that are received at a second antenna through a second radio front end. For example, the symbols 528 from the second antenna are received at the input IN2. The ULFE(2) writes the symbols 528 to the SMEM(2), and then sends indicator 242(2) to the PSM(2) to indicate the start of the symbols being written into the SMEM(2). The PSM(2) now has access to symbols (506 and 528) received from two antennas that are now stored in the MEM(2). The PSM(2) can now determine which symbols provide the better characteristics and process those symbols utilizing the remote scheduling and control command 516. For example, the PSM(2) sends jobs 526 to the FFE(2) and the PFE(2) to obtain the selected symbols from the MEM(2) as shown by path 530. In another embodiment, the PSM(2) can send out jobs that combine the symbols to obtain improved signal quality and/or noise reduction.

Thus, the baseband processing systems 502 and 504 operate in a CoMP architecture to provide coordinated multipoint receiver processing acceleration and latency reduction. It should be noted that although FIG. 5 illustrates how symbols are transferred from SOC1 502 for processing at SOC1 504, the same processes can be used to transfer symbols from SOC2 504 for processing at SOC1 502 to achieve the same low latency. In still another embodiment, symbols can be transferred in both directions (e.g., from SOC1 to SOC2, and from SOC2 to SOC1) to allow processing of symbols receive by multiple antennas at both baseband processing systems simultaneously with low latency.

Figure 6:
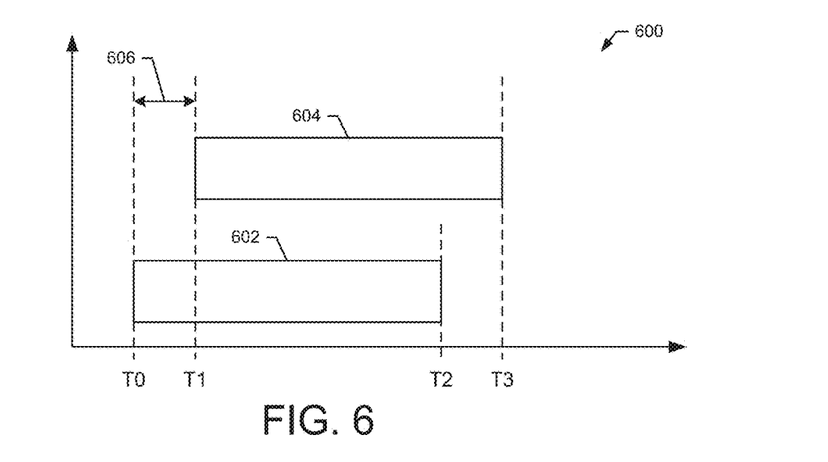
FIG. 6 shows an exemplary embodiment of a timing diagram that illustrates reduced symbol latency resulting from operation of the CoMP architecture.

FIG. 6 shows an exemplary embodiment of a timing diagram 600 that illustrates low latency resulting from operation of exemplary embodiments of the CoMP architecture. For example, the timing diagram 600 illustrates symbol timing for symbols received by the CoMP architecture shown in FIG. 5.

A symbol 602 is transmitted from a UE and received at a second antenna. The symbol is input to the ULFE(2), as shown in FIG. 5. The ULFE(2) stores the symbol 602 in the memory SMEM(2) beginning at time T0. The symbol storage is complete at time T2.

A symbol 604 is the same symbol as the symbol 602. The symbol 604 is received at a first antenna and is input to the ULFE(1), as shown in FIG. 5. The symbol 604 is written into SMEM(1) and then read out from the SMEM(1) using direct connection 234(1) and input to the link(1). The link(1) transfers the symbol 604 over the high speed channel 236 where it is received by the link(2). The link2 transfers the symbol 604 to the SMEM(2) over the direction connection 234(2). The symbol 604 is written into the SMEM(2) at time T1. The storage of symbol 604 is completed at time T3.

The timing diagram 600 illustrates the delay 606 (or latency) between the symbols as they arrive at the SMEM (2). In various exemplary embodiments, the delay 606 in receiving the two symbols at the SMEM(2) is less than one symbol time and typically less than one microsecond.

Figure 7:
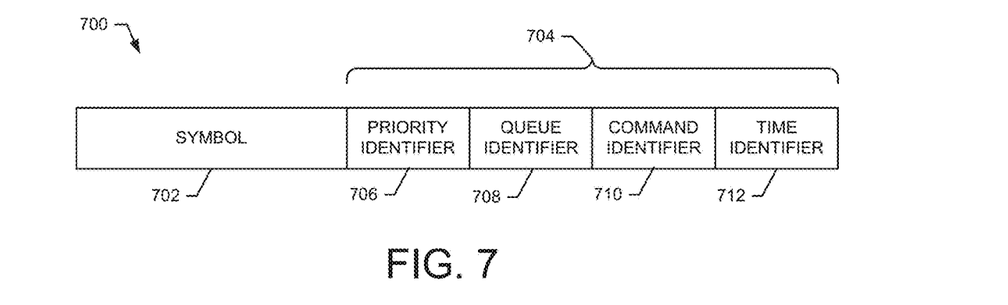
FIG. 7 shows an exemplary embodiment of a combined symbol that illustrates remote scheduling and control information used in an exemplary embodiment of the CoMP architecture.

FIG. 7 shows an exemplary embodiment of a combined symbol 700 that illustrates remote scheduling and control information used in an exemplary embodiment of the CoMP architecture. For example, the combined symbol 700 includes a symbol 702 and remote scheduling and control information 704 attached at the end of the symbol 702. The control information 704 comprises a priority identifier 706, queue identifier 708, command identifier 710 and time identifier 712. In an exemplary embodiment, the remote scheduling and control information 704 is placed before the symbol 702 (e.g., their order is reversed).

In an exemplary embodiment, the priority identifier 706 identifies a priority associated with the processing of the symbol 702. The queue identifier 708 identifies a processing queue to be used to process the symbol 702. For example, queue identifier 708 identifies one of the queues 406 in the scheduler 210. The command identifier 710 identifies a command or job that the scheduler 210 will schedule to begin processing of the symbol 702. The time identifier 712 identifies a time stamp within the current frame when the symbol 702 is to be processed.

Figure 8:
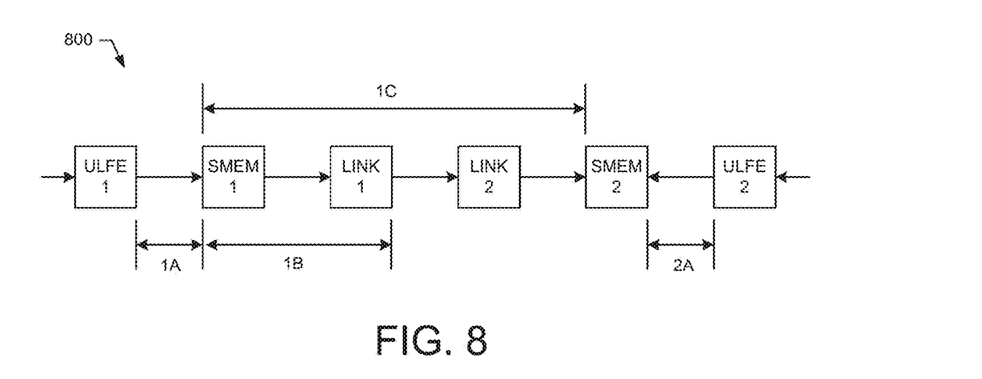
FIG. 8 shows an exemplary embodiment of a timing diagram that illustrates low latency provided by embodiments of the CoMP architecture.

FIG. 8 shows an exemplary embodiment of a timing diagram 800 that illustrates the low latency operation of the CoMP architecture. As illustrated in FIG. 8, a symbol in a transmission from UE is received at a first antenna and transferred to the ULFE(1). A time interval (1A) of approximately 400 nanoseconds (ns) is used to store the received symbol in the memory SMEM(1). A time interval (1B) of approximately 100 ns is used to pass a symbol from the SMEM(1) and output that symbol from the link(1). A time interval (1C) of less than one microsecond is used to transfer the stored symbol from the memory SMEM(1) to the link(1), transfer the symbol from the link(1) to the link(2), and transfer the symbol from the link(2) to the SMEM(2).

Concurrently with the above operations, the same symbol is received at a second antenna and transferred to the ULFE(2) of a second baseband processing system. A time interval (2A) of approximately 400 ns is used to transfer the symbol from the ULFE(2) to the SMEM(2). At this point, symbols received by both baseband processing systems are now stored in the memory SMEM(2). As a result of the above time intervals, the latency between storing both received symbols in the SMEM(2) is less than one symbol time and typically less than one microsecond.

Figure 9:
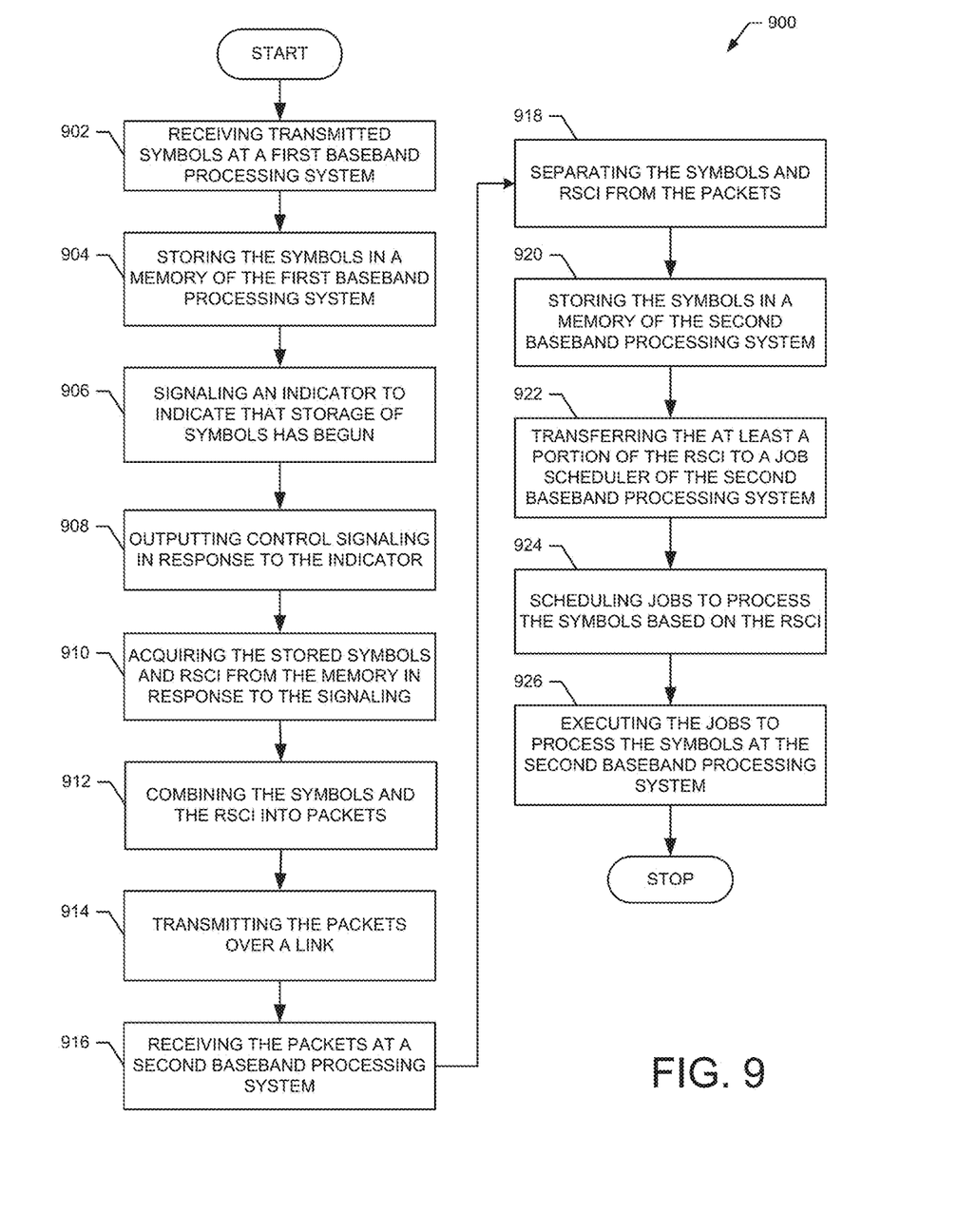
FIG. 9 shows an exemplary embodiment of a method for operating a CoMP architecture in accordance with one embodiment of the present invention.

FIG. 9 shows an exemplary embodiment of a method 900 for operating a CoMP architecture in accordance with one embodiment of the present invention. For example, the method is suitable for use with the CoMP architecture shown in FIG. 5 to receive symbols at a first baseband processing system and process those symbols at a second baseband processing system.

At block 902, transmitted symbols are received at a first baseband processing system. For example, as illustrated in FIG. 5, symbols received at a first antenna are input to the ULFE(1) of a first baseband processing system 502 configured on SOC1.

At block 904, the received symbols are stored in a memory of the first baseband processing system. For example, as illustrated in FIG. 5, the ULFE(1) stores the received symbols 506 in SMEM(1).

At block 906, an indicator is signaled to a job scheduler to indicate that storage of the symbols in the memory has begun. For example, as illustrated in FIG. 5, the ULFE(1) outputs indicator 242(1) to PSM(1) to indicate that the storage of received symbols 506 in SMEM(1) has begun.

At block 908, in response to the indicator, control signaling is output. For example, as illustrated in FIG. 5, in response to receiving the indicator 242(1), the PSM(1) outputs control signaling 516 to control the link(1) to access the memory to obtain the symbols and remote scheduling control information. In an exemplary embodiment, the RSCI is preconfigured in the SMEM(1) at start up.

At block 910, the stored symbols and RSCI are read from memory in response to the control signaling. For example, as illustrated in FIG. 5, the PSM(1) outputs control signaling 516 that controls the link(1) to acquire the symbols and RSCI stored in SMEM(1) over the direction connection 234(1).

At block 912, the symbols and remote scheduling control information are combined into packets. As illustrated in FIG. 5, the link(1) combines the symbols with the remote scheduling control information to the generate packet 518. For example, in an exemplary embodiment, the packets are generated as illustrated in FIG. 7 wherein the remote scheduling and control information is either prepended or appended to the data symbol.

At block 914, the packets are transmitted over a high-speed channel to a link at a second baseband processing system. For example, as illustrated in FIG. 5, the link(1) transfers the packets 518 to the link(2) over the high speed channel 236.

At block 916, the transmitted packets are received at a link interface of the second baseband processing system. For example, as illustrated in FIG. 5, the link(2) receives the packets 518 from the high speed channel 236.

At block 918, the symbols and remote scheduling control information are separated from the packets at the receiving link. For example, as illustrated in FIG. 5, the link(2) separates the symbol data 506 and the remote scheduling control information 516 from the packets 518.

At block 920, the separated symbols are stored in a memory of the second baseband processing system. For example, as illustrated in FIG. 5, the link(2) stores the received symbols 506 in SMEM(2) using the direct connection 234(2). The link(2) may also store the RSCI information in the SMEM(2).

At block 922, at least a portion of the remote scheduling control information is passed to a job scheduler of the second baseband processing system. For example, as illustrated in FIG. 5, the link(2) passes a command portion of the remote scheduling control information 516 to the PSM(2) using the bus 208(2).

At block 924, processing jobs are scheduled to process the symbols based on the remote scheduling control information. For example, as illustrated in FIG. 5, the PSM(2) schedules processing jobs to process the symbols in the SMEM(2) based on the received command portion of the RSCI. For example, the PSM(2) uses the commands portion of the RSCI to schedule jobs associated with selected job queues 406 (FIG. 4A). The scheduled jobs are output to the FFE(2) and/or the PFE(2) using the bus 208(2).

At block 926, the scheduled jobs are executed to process the symbols at the second baseband processing system. For example, the scheduled jobs are performed by the FFE(2) and the PFE(2). Thus, symbols received at the first baseband processing system 502 are sent with low latency (e.g., less than one half symbol time) to the second baseband processing system 504 for processing.

Thus, the method 900 operates in a CoMP architecture in accordance with one embodiment of the present invention. For example, the method 900 operates in a CoMP architecture to receive symbols at a first baseband processing system and schedule the processing of those symbols at a second baseband processing system. It should also be noted that the operations of the method 900 may be changed, modified, added to, subtracted from, or otherwise rearranged within the scope of the embodiments.

Figure 10:
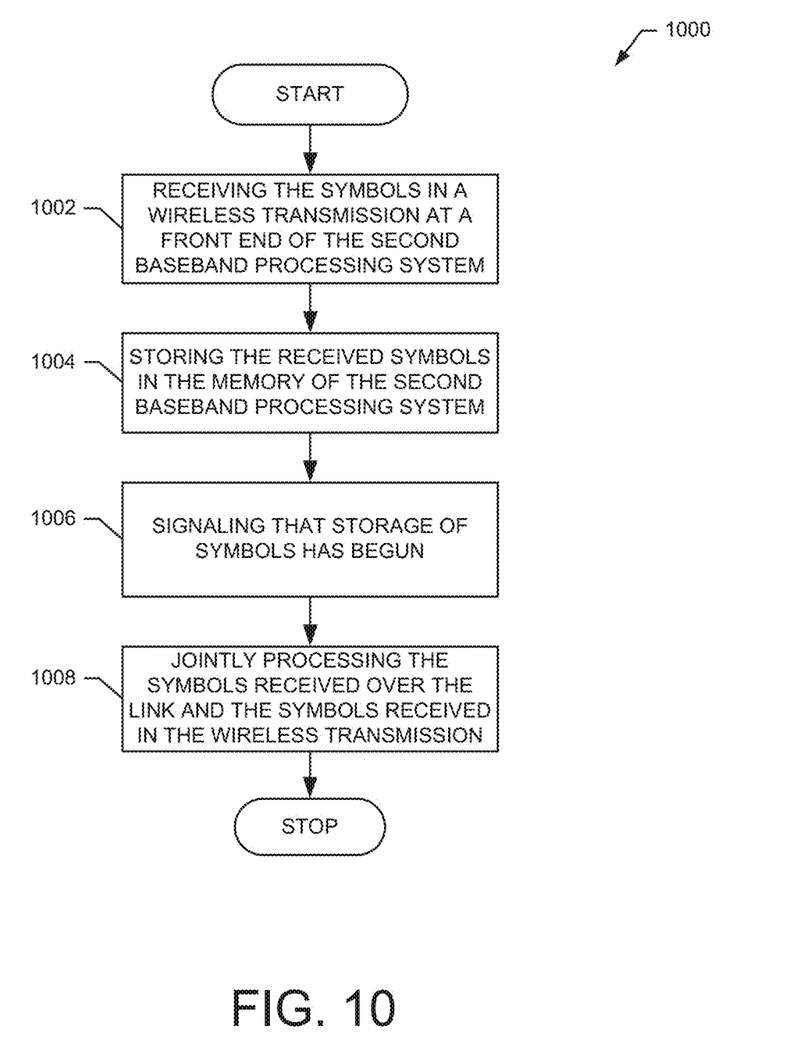
FIG. 10 shows an exemplary embodiment of a method for operating a CoMP architecture in accordance with one embodiment of the present invention.

FIG. 10 shows an exemplary embodiment of a method 1000 for operating a CoMP architecture in accordance with one embodiment of the present invention. For example, the method is suitable for use with the CoMP architecture shown in FIG. 5 to process multiple versions of transmitted symbols at one baseband processor. In an exemplary embodiment, the method 1000 operates in parallel with the method 900.

At block 1002, transmitted symbols are received at a front end of a second baseband processing system. For example, as illustrated in FIG. 5, symbols received at a second antenna are input to the ULFE(2) of the second baseband processing system 504. In an exemplary embodiment, the received symbols 528 represent a second version the symbols 506. Although transmitted by the same UE, this second version is received by a different antenna.

At block 1004, the received symbols are stored in a memory of the second baseband processing system. For example, as illustrated in FIG. 5, the ULFE(2) stores the received symbols 528 in SMEM(2).

At block 1006, an indicator is signaled to a job scheduler that storage of the symbols in the memory has begun. For example, as illustrated in FIG. 5, the ULFE(2) outputs indicator 242(2) to PSM(2) to indicate that the storage of received symbols 528 in SMEM(2) has begun.

When the methods 900 and 1000 run in parallel, block 926 is replaced with block 1008 below, since the MEM(2) now stores two versions of the symbols for processing.

At block 1008, the symbols received over the link and the symbols received in the wireless transmission are processed jointly or separately. In an exemplary embodiment, the PSM(2) jointly processes the first 506 and second 528 sets of symbols stored in SMEM(2). In an exemplary embodiment, the PSM(2) enqueues jobs for a PFE or FFE to determine which symbols to process by comparing key metrics, such as the SNR of the received symbols or available resource elements, and picking the symbols with the better metric for processing. The PSM(2) may also enqueues jobs for a PFE or FFE to combine the symbols for processing. The PSM(2) controls the PFE or FFE to implement virtually any type of signal processing on the first 506 and second 528 sets of symbols stored in the SMEM(2).

Thus, the method 1000 operates a CoMP architecture in accordance with one embodiment of the present invention. It should also be noted that the operations of the method 1000 may be changed, modified, added to, subtracted from, or otherwise rearranged within the scope of the embodiments.

While particular embodiments of the present invention have been shown and described, it will be obvious to those skilled in the art that, based upon the teachings herein, changes and modifications may be made without departing from the exemplary embodiments of the present invention and their broader aspects. Therefore, the appended claims are intended to encompass within their scope all such changes and modifications as are within the true spirit and scope of the exemplary embodiments of the present invention.

What is claimed is:

1. An apparatus, comprising:
   a receiver that receives symbols from a wireless transmission and stores the symbols in a memory, and wherein the receiver outputs an indicator that indicates that storage of the symbols in the memory has begun;
   a controller that outputs control signaling in response to the indicator;
   a link, which is a circuit containing a controller and a transceiver, that acquires the symbols and remote scheduling and control information (RSCI) from the memory in response to receiving the control signaling, wherein the link combines the symbols with the RSCI to form packets, and wherein the link transmits the packets to an external system, wherein the apparatus forms a first baseband processing system and wherein the external system forms a second baseband processing system; and
   a second link at the second baseband processing system, wherein the second link receives the packets and separates the symbols and the RSCI from the packets, and wherein the second link transfers at least a portion of the RSCI to a second controller located at the second baseband processing system and stores the symbols in a second memory located at the second baseband processing system.

2. The apparatus of claim 1, wherein a latency time interval measured from the indicator to a start of transmission of the packets from the link is approximately one microsecond or less.

3. The apparatus of claim 1, wherein the RSCI is stored in the memory prior to receiving the symbols.

4. The apparatus of claim 1, further comprising a direct connection between the memory and the link, and wherein the link acquires the symbols from the memory over the direct connection.

5. The apparatus of claim 1, further comprising a data bus between the memory and the link, and wherein the link acquires the symbols from the memory over the data bus.

6. The apparatus of claim 1, wherein the link transmits the packets to the external system over a high-speed channel.

7. The apparatus of claim 1, further comprising a second link at the second baseband processing system, wherein the second link receives the packets and separates the symbols and the RSCI from the packets, and wherein the second link transfers at least a portion of the RSCI to a second controller located at the second baseband processing system and stores the symbols in a second memory located at the second baseband processing system.

8. The apparatus of claim 1, further comprising a second direct connection that connects the second link and the second memory, and wherein the second link transfers the symbols to the second memory over the second direct connection.

9. The apparatus of claim 1, further comprising a second receiver located at the second baseband processing system that receives a second version of the symbols from the wireless transmission and stores the second version of the symbols in the second memory.

10. The apparatus of claim 9, wherein the symbols represent a first version of the symbols, and wherein a latency time interval between storing a selected symbol of the second version of the symbols in the second memory and storing the selected symbol of the first version of the symbols in the second memory is less than one symbol time.

11. The apparatus of claim 1, wherein the second baseband processing system processes at least one of the first and second versions of the symbols according to the at least a portion of the RSCI.

12. The apparatus of claim 1, wherein the first baseband processing system and the second processing system are formed as system-on-chip (SOC) devices.

13. A method, comprising:
receiving symbols from a wireless transmission;
storing the symbols in a memory;
signaling that the symbols are available in the memory;
acquiring the symbols and remote scheduling control information RSCI in response to the signaling;
combining the symbols with the RSCI to form packets; and
transmitting the packets to an external system, wherein the method is performed at a first baseband processing system and wherein the external system forms a second baseband processing system;
receiving, at the second baseband processing system, the packets;
separating the symbols and the RSCI from the packets;
storing the symbols in a second memory located at the second baseband processing system;
extracting command information from the RSCI; and
processing the symbols based on the command information.

14. The method of claim 13, wherein a latency time interval measured from a start of the operation of storing to a start of the operation of transmitting is less than one microsecond.

15. The method of claim 13, wherein the operations performed at the second baseband processing system further comprise:
receiving a second version of the symbols from the wireless transmission; and
storing the second version of the symbols in the second memory.

16. The method of claim 15, wherein the operations performed at the second baseband processing system further comprise processing the symbols and the second version of the symbols according to the RSCI.

17. The method of claim 15, wherein a latency time interval between storing a selected symbol of the symbols in the second memory and storing the selected symbol of the second version of the symbols in the second memory is less than one symbol time.

* * * * *